The term "dicyclopentadiene" as used herein refers to the cyclic compound having the structure:

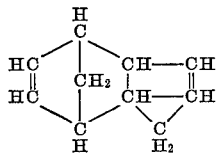

The term "vinylidene" as used herein has generic reference both to vinylidene radicals ($CH_2=C<$), and vinyl radicals ($CH_2=CH-$ or $-CH=CH-$); observe that in carbocyclic compound mixtures used in this invention having a phenyl group substituted by a vinylidene group, alpha-methyl substitution is included in this definition, as well as styrene, methyl styrene, and ethyl styrene.

All solids herein are conveniently measured using ASTM Test Procedure No. D-115-55.

Such a starting material diene codimer compound mixture can be prepared synthetically or derived by suitable preparative procedures from naturally occurring crude petroleum, as those skilled in the art will appreciate. A preferred mixture of such diene codimer compounds for use in this invention is a petroleum derived blend of components having diluents already incorporated thereinto. For example, suitable such mixtures are shown in the following Tables I–III. In Table I is shown an example of such a mixture available commercially under the trade designation "Dicyclopentadiene Concentrate" from the Monsanto Company, St. Louis, Mo.; in Table II, one available commercially under the trade designation. "Resin Former P" from Hess Oil and Chemical Co. of New York, N.Y. and in Table III, one available commercially under the trade designation "Dicyclopentadiene" from Union Carbide Co., New York, N.Y. and also one available commercially under the trade designation "Dicyclopentadiene" from Eastman Kodak Co., Rochester, N.Y.

TABLE I

| Component [1] | Total est. wt. percent [2] | Adjusted rel. approx. wt. [3] |
|---|---|---|
| (A) Dicyclopentadiene compounds: | | |
| (1) Dicyclopentadiene | 72.1 | 77.1 |
| (2) Codimers of cyclopentadiene and methylcyclopentadiene | 0.4 | 0.4 |
| (B) Cyclopentadiene/alkadiene codimers (codimers of cyclopentadiene and acyclic conjugated alkadienes containing from 4 through 6 carbon atoms per molecule) [4] | 18.6 | 19.8 |
| (C) Conjugated alkadienes (cyclic and acyclic conjugated alkadienes containing 5 and 6 carbon atoms per molecule) [5] | 2.2 | 2.3 |
| (D) Alkenes: cyclopentene | 0.4 | 0.4 |
| Total of (A), (B), (C), and (D) | 93.7 | 100.0 |
| (E) Inert hydrocarbon diluents (Total) | 6.3 | |
| (1) Benzene | 0.9 | |
| (2) Methylpentane, methylcyclopentane, and hexane | 5.4 | |

[1] Data in Table I derived from vapor-liquid-phase chromatography and mass spectrography.
[2] Based on total weight of diene dimer compounds and other components including diluents.
[3] Diene codimer compound mixture when in a form substantially free of other materials wherein the sum of all component compounds in any given such mixture equals substantially 100 weight percent.
[4] These alkadienes are usually piperylene and isoprene; composition of such alkadienes is somewhat variable.
[5] These alkadienes are usually piperylene, isoprene and cyclopentadiene; composition of such alkadienes is somewhat variable.

TABLE II

| Component | Total weight percent basis [1] | Weight percent diene codimer mixture component, only |
|---|---|---|
| Arylcycloalkenes | 1.7 | 1.9 |
| Indene | 1.7 | 1.9 |
| Dicyclopentadienes: | 65.5 | 74.1 |
| Dicyclopentadiene | 48.9 | 55.3 |
| Methyldicyclopentadiene | 15.2 | 17.2 |
| Dimethyldicyclopentadiene | 1.4 | 1.6 |
| Cyclopentadiene/alkadiene codimers | 8.0 | 9.1 |
| (codimers of cyclopentadiene with acyclic conjugated alkadienes having from 4 through 6 carbon atoms per molecule): | | |
| Codimer with butadiene | 6.0 | 6.8 |
| Codimer with isoprene | 2.0 | 2.3 |
| Arylalkenes: | 6.9 | 7.7 |
| Styrene | 5.6 | 6.3 |
| Alphamethylstyrene | 1.3 | 1.4 |
| Trimers incorporating cyclopentadiene, methyl-cyclopentadiene or conjugated alkadienes having from 4 through 6 carbon atoms per molecule | 6.4 | 7.2 |
| Diene codimer mixture subtotal | 88.5 | 100.0 |
| Unidentified Components | 3.1 | |
| Inert diluents: | 9.4 | |
| Benzene | 0.1 | |
| Toluene | 3.7 | |
| Xylene and ethylbenzene | 5.1 | |
| Naphthalene | 0.5 | |

[1] These values derived using a combination of vapor liquid phase chromatography and mass spectrometry.
[2] When in a form substantially free of other materials wherein the sum of all component compounds of any given such mixture equals substantially 100 weight percent.

TABLE III

| Component | Carbide, wt. percent [1] | Eastman, wt. percent [1] |
|---|---|---|
| Dicyclopentadienes | 93.2 | 95.6 |
| Methyldicyclopentadienes | 3.0 | 0.9 |
| Cyclopentadiene/acyclic conjugated diene codimers | 2.5 | 1.9 |
| Heavy ends [2] | 0.2 | 0.6 |
| Unidentified | 1.1 | 1.0 |

[1] These values derived using a combination of vapor liquid phase chromatography and mass spectrometry.
[2] Heavy ends here comprise primarily trimers of such components as cyclopentadiene, methylcyclopentadiene, and conjugated alkadienes containing from 4 through 6 carbon atoms per molecule. Typically, these heavy ends are reactive with phenol under Friedel-Crafts conditions as taught herein.

To react phenol with such an aforedescribed cyclopentadiene codimer mixture, it is convenient to use Friedel-Crafts conditions, as indicated.

The term "Friedel-Crafts conditions" as used herein refers to the conventional conditions known to those of ordinary skill in the art used for the alkylating or arylating of hydrocarbons (including phenol) by the catalytic action of aluminum chloride or equivalent catalyst in the presence of appropriate heat and pressure. Conveniently, the phenol and suitable Friedel-Crafts acid catalyst are mixed, brought to the proper temperature and the diene codimer compound mixture metered into the acidified (or catalyzed) phenol.

For purposes of this invention, the reaction of diene codimer compound mixture with phenol is preferably carried out at temperatures in the range of from about 25 to 200° C., although higher and lower temperatures can be used. Also, the reaction is preferably conducted under liquid phase conditions at or below atmospheric pressures although superatmospheric pressures can be used. Inert hydrocarbons, as indicated above, generally facilitate the process. Such inert hydrocarbons can be readily removed, such as by vacuum stripping, at the completion of the reaction if desired. Especially when stripping is contemplated, the most preferred inert hydrocarbons having boiling points between about 70 and 140° C. The progress of the reaction can be monitored, if desired, by measuring the quantity remaining of unreacted diene codimer compound using, for example, vapor phase chromatography.

Friedel-Crafts catalysts which may be used in place of aluminum chloride, or together with aluminum chloride, include:

(A) Other inorganic halides, such as gallium, titanium, antimony and zinc halides (including $Z_nCL_2$);

(B) Inorganic acids, such as sulphuric, phosphoric and the hydrogen halides (including HF);

(C) Activated clays, silica gel alumina, and the like;

(D) $BF_3$ and $BF_3$ organic complexes including complexes of $BF_3$ with organic compounds, such as ethanol, butanol, glycol, phenol, cresol, anisole, ethyl ether, isopropyl ether, di-n-butyl ether, formic acid, acetic acid, and propionic acid, or with inorganic acids, such as phosphoric acid, sulfuric acid, and the like; and (E) Alkyl, aryl and aralkyl sulfonic acids, such as ethane-sulfonic acid benzene sulfonic acid, benzene disulfonic acid, chlorobenzene sulfonic acid, 3,4-dichlorobenzene sulfonic acid, cresol sulfonic acids, phenol sulfonic acids, toluene sulfonic acids, xylene sulfonic acids, octylphenol sulfonic acid, B-naphthalene sulfonic acid, 1-naphthol-4-sulfonic acid, and the like.

When $BF_3$, as such, is employed, it is conveniently fed to a reaction mixture in gaseous form. While any combination of diene codimer compound starting mixture, phenol and catalyst can be used, it is particularly convenient to react for each 100 parts by weight of phenol about 10 to 100 by weight parts of such diene codimer compound mixture (on a 100 weight percent basis in a form substantially free of other materials) in the presence of less than about 10 weight percent (based on the phenol) of acid catalyst.

The reaction mass is then heated to a temperature in the range of from about 25 to 200° C. The rate of this reaction is dependent, to some degree, on the temperature employed. In general, the reaction is rapid, and a complete reaction between phenol and diene codimer compound mixture is preferred. Suitable process variables are summarized in Table IV below.

TABLE IV

| Process variable | Broad range | Preferred range |
| --- | --- | --- |
| Temperature, ° C | About 25 to 200° C | About 70 to 125° C. |
| Catalyst (based on phenol) | Less than about 10 weight percent. | About 0.1 to 1.0 weight percent. |
| Reaction time | Less than about 4 hours. | About 10 to 20 minutes. |
| Inert hydrocarbon content (based on total weight diene codimer compound mixture and diluent). | Up to about 50 weight percent. | About 2 to 10 weight percent. |
| Total diene codimer compound mixture [4] (based on 100 parts by weight phenol). | About 10 to 100 parts by weight. | About 20 to 70 parts by weight. |

[4] On a 100 weight percent basis in a form substantially free of other materials.

In general, to produce a resole phenol-formaldehyde resin for use in this invention from a substituted phenol product prepared as just described, such product is neutralized under aqueous liquid phase conditions as by the addition of base, and then from about 0.8 to 2.0 moles of formaldehyde per one mole (starting) phenol is mixed with the substituted phenol product (now itself a starting material). Also a basic catalyst material such as hexamethylenetetramine, ammonium hydroxide, triethylamine, sodium hydroxide, mixtures thereof, and the like, is introduced into the reaction mixture. The pH of this reaction mixture using such basic catalyst is maintained about 7.0.

It will be appreciated that the formaldehyde to phenol ratios herein described have reference to the total amount of phenol present before a reaction, including the phenol which is substituted by the diene codimer compound mixture, as described above. Aqueous liquid phase preparation conditions are generally but not necessarily used.

To optimize electrical properties in such resole products it is preferred to use as a basic catalyst, when reacting such substituted phenols with formaldehyde, one which is organic (substantially non-ionic) in character, such as triethylamine, or the like. Suitable process variables for making such resole are summarized in Table V below:

TABLE V

| Process variable | Broad range | Preferred range |
| --- | --- | --- |
| Formaldehyde/phenol mol ratio. | About 0.8-2.0 | About 1.0-1.5. |
| Catalyst parts by weight (based on 100 parts by weight total phenol after neutralization of starting phenol). | About 0.1-10 | About 0.5-4. |
| pH | Above about 7.0 | About 7.5-8.5. |
| Temperature | About 60° C. to reflux. | About 80° C. to reflux. |
| Reaction time | Under about 4 hours | About 20-120 min. |

The resole product produced by reacting the substituted phenol with aldehyde as described above is one composed of methylolated substituted phenol which has been methylolated by the formaldehyde to a desired methylol content and optionally advanced (e.g. the molecular weight of the methylolated substituted phenol increased) as by heating as necessary or desirable to make a resole product having characteristics generally as described above. Such a resole can be regarded as being the reaction product of the above-described substituted phenol mixture and formaldehyde under aqueous base catalyzed conditions as described which product can be thermoset by heat alone without the use of a curing catalyst. In general, however, such resole product as made is a brown colored, unstable, multiphase aqueous emulsion whose viscosity depends, in any given instance, upon process and reactant variables but which usually ranges from a syrupy liquid to a semi-solid state. A resole product derived from such aqueous phase as a brown colored material whose viscosity varies from a syrup to a solid. Such emulsion is preferably dehydrated and formed into a varnish for use in making the impregnated sheet products of this invention.

Thus, when such emulsion is dehydrated under heat and reduced pressure to a water content generally under about 15 weight percent but over about 2 weight percent, there is produced a single-phased, clear, resole resin in the physical form usually of a high solids viscous dark fluid. In any given instance, its total solids content, (residual) water content, and viscosity depend upon the amount of substituted phenol, type and amount of methylolation catalyst, conditions and reactants used to substitute the phenol, methylolation temperature, degree of advancement, and the like.

When such a dehydrated liquid resole is further dehydrated to a water content under about 2 weight percent, there is produced a solid, so-called "one-stage lump resin" which consists substantially of pure resin. Usually the water content after such a dehydration is not less than about 0.5 weight percent of the product resin, in general.

Suitable resole dehydration conditions typically involve the use of a vacuum ranging from about 25 to 28 inches Hg and temperatures ranging from about 40 to 90° C. Higher and lower temperatures and pressures can be employed, as those skilled in the art appreciate.

To prepare a varnish from a dehydrated resole product as described above, such resole is then conveniently dissolved in a relatively volatile, inert organic solvent medium having properties generally as defined above. It is not necessary, and it is preferred not, to prepare the resole resin in the form of a solid before dissolution thereof in organic solvent. In general, the water content of the par-

United States Patent Office 3,537,952
Patented Nov. 3, 1970

3,537,952
PLASTICIZED PHENOLIC RESIN IMPREGNATION SYSTEM
Ronald H. Dahms, Springfield, Mass., assignor to Monsanto Company, St. Louis, Mo., a corporation of Delaware
No Drawing. Filed July 25, 1968, Ser. No. 747,447
Int. Cl. B32b 27/00, 27/10, 27/42
U.S. Cl. 161—259   5 Claims

ABSTRACT OF THE DISCLOSURE

Compositions of two different phenolic resole resins and a compatible halo aryl phosphate. The compositions are storage stable and can be used for the single pass impregnation of cellulosic sheets which are in turn useable in the manufacture of laminates having fire retardancy, low temperature punchability, low water absorption and good electrical characteristics.

BACKGROUND

In the art of making laminates using phenolic resins and cellulosic substrates, there has been a long felt need for good electrical properties combined with fire retardancy and crack-free punchability. Pure thermoset phenolic resins particularly in combination with cellulosic substrates not only have a tendency to combust at elevated temperatures, but also have relatively mediocre electrical properties. In addition, they characteristically display a capacity to be punched only at elevated temperatures (e.g., temperatures above about 100° C.) without cracking.

Heretofore, in an effort to combat these deficiencies, the art has attempted to compound plasticizers with liquid phenolic resins before such are impregnated into cellulosic substrates in laminate manufacture. Such combinations, though they have sometimes worked to a degree to accomplish the other desired objectives, have not imparted any particular fire retardancy to the resulting laminates. It has been a very difficult problem to compound liquid phenolic resins with compatible plasticizers which will not only characteristically maintain electrical properties and improve punchability in the product laminates, but which will also improve fire retardancy therein, and at the same time not adversely affect other desired properties in a product laminate. The problem of compounding is further complicated by the fact that the art desires to impregnate preformed cellulosic sheets in a single pass operation so that it is necessary to have all components in a single resin treating formulation, making compatibility of components essential.

There has now been discovered a class of liquid phenolic resin formulations suitable for a single pass impregnation of cellulosic preformed substrate members which contains a combination of two different resole resin components and a member of a class of certain fire retardant plasticizers. When this formulation is used for the manufacture of laminates incorporating cellulosic substrates, there are produced product laminates having a surprising combination of good electrical properties, high fire retardancy and relatively low temperature punchability.

SUMMARY

This invention is directed to new and useful solutions of plasticizers and resole resins, to intermediate cellulosic preformed substrate sheet members impregnated therewith, and to thermoset laminates made from such impregnated sheet members.

The solutions of plasticizers and resole resins of this invention are surprising not only because the particular plasticizers employed are compatible with the particular resole resins employed in the respective amounts of each used (i.e. the one type of component does not interact chemically or physically with the other), but also because the resulting solutions are storage stable for prolonged periods of time. The thermoset laminates of this invention are surprising because of their combination of good electrical properties (low dielectric constants and low dissipation factors), good fire retardancy, low water absorption, and relatively low crack free punch temperatures compared to, for example, these same resole resins used without this plasticizer.

The solutions of this invention comprise:

(A) From about 5 to 20 weight percent (total resin solids basis) of water-soluble phenol-formaldehyde resole resin having a combined phenol to formaldehyde mol ratio of from about 1.0 to 2.5, (B) From about 50 to 75 weight percent (total resin solids basis) of a substituted phenol-formaldehyde resole resin, (C) From about 15 to 35 weight percent (total solids basis) of at least one organo phosphate of the formula:

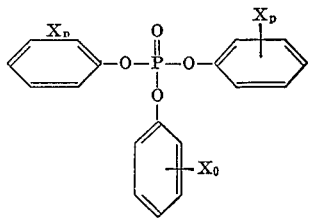

where, each individual X is selected from the group consisting of fluorine, chlorine, bromine, and iodine, and $n$, $o$, and $p$ are each an integer from 0 through 5 inclusive, and at least one of $n$, $o$ and $p$ in any given molecule is an integer greater than 0, and (D) The balance up to 100 weight percent (total solids basis) of any given solution being an organic liquid which:

(1) is substantially inert (as respects solution components), (2) evaporates below about 150° C. at atmospheric pressures, and (3) is a mutual solvent for said resins and said organo phosphate.

Optionally, up to about 15 weight percent water can be present in dissolved form in said organic liquid. The intermediate (non-thermoset) cellulosic preformed substrate sheet members of this invention are impregnated with from about 5 to 70 weight percent (based on total sheet member weight) of solids derived from a solution of this invention.

The laminates made from these intermediate sheet members employ a plurality of such members arranged face to face in a layered configuration and thermoset together under heat and pressure to form an integral article of manufacture.

The water-soluble phenol-formaldehyde resole resin used in the phenolic resin solutions of this invention is produced by reacting under aqueous liquid phase conditions phenol with formaldehyde in the presence of a basic catalyst (preferably organic). It has a low molecular weight as demonstrated by the fact that this resin is water soluble. Thus, a 55 weight percent aqueous solution thereof can be prepared. This solution characteristically has a water dilutability of at least about 1:1, and preferably of at least about 8:1. In addition, this resin has a free formaldehyde content which is less than about 5 weight percent. Preferably, the combined phenol to formaldehyde mol ratio in this resin ranges from about 1 to 2.5. An organic base catalyst is preferably used in preparation as indicated so as to produce a resole resin product which will not contain free ions which might conduct an electrical charge after the resin has been thermoset. Suitable organic basic catalysts are well known to the art; examples include triethylamine, hexamethylene-tetramine, and the like. The preparation of such resins is well known to those of ordinary skill in the art.

The substituted phenol-formaldehyde resole resin employed in the products of this invention has a formaldehyde to phenol mol ratio of from about 0.8 to 2.0 (preferably from about 0.9 to 1.5), and is produced by reacting in the presence of a basic (preferably organic) catalyst under liquid aqueous phase conditions a certain substituted phenol mixture with formaldehyde. The resole resin used in this invention further has a relatively high molecular weight as shown by the fact that it is substantially water insoluble but has a methanol solubility such that a 60 weight percent solution thereof can be prepared in methanol. Such methanol solution characteristically has a viscosity not greater than about 5000 centipoises, and preferably in the range from about 50 to 500 centipoises. In addition, this resin has a free formaldehyde content which is less than about 5 weight percent.

It will be appreciated that the aldehyde to phenol ratios herein described have reference to the total amount of phenol present before a reaction, including the phenol which is substituted.

The substituted phenol mixture used to make such resin is itself prepared by initially reacting phenol under Friedel Crafts conditions with a mixture of cyclopentadiene codimers which comprises (when in a form substantially free of other materials wherein the sum of all component compounds of any given such mixture equals substantially 100 weight percent):

(A) From about 50 to 99 weight percent of compounds each molecule of which has:

(1) the dicyclopentadiene nucleus
(2) from 10 through 13 carbon atoms
(3) as nuclear substituents from 0 through 3 methyl groups, and (B) From about 1 to 50 weight percent of compounds each molecule of which is a codimer of cyclopentadiene with at least one acyclic conjugated alkadiene having from 4 through 6 carbon atoms per molecule.

In a preferred such mixture, a minor amount of cyclic and/or acyclic conjugated alkadiene is present, typically less than about 15 weight percent (same basis) and having 5 or 6 carbon atoms per molecule. Thus, such a mixture can comprise:

(A) From about 70 to 90 weight percent of dicyclopentadiene, (B) From about 10 to 30 weight percent of compounds each molecule of which is a codimer of cyclopentadiene with at least one acyclic conjugated alkadiene having from 4 through 6 carbon atoms per molecule, and (C) From about 2 to 15 weight percent of compounds each molecule of which is a cyclic and/or acyclic conjugated alkadiene having 5 or 6 carbon atoms per molecule.

In another preferred such mixture, both a minor amount (less than about 10 weight percent-same basis) of compounds containing the indene nucleus, and a minor amount (less than about 15 weight percent-same basis) of compounds containing the phenyl vinylidene structure are present. Thus, such a mixture can comprise:

(A) From about 1.5 to 10 weight percent of compounds each molecule of which has:

(1) the indene nucleus
(2) from 9 through 13 carbon atoms
(3) as nuclear substituents from 0 through 4 methyl groups (B) From about 50 to 70 weight percent of compounds each molecule of which has:

(1) the dicyclopentadiene nucleus
(2) from about 10 through 13 carbon atoms
(3) as nuclear substituents from 0 through 3 methyl groups, (C) From about 4 to 10 weight percent of compounds each molecule of which is a codimer of cyclopentadiene with at least one acyclic conjugated alkadiene having from 4 through 6 carbon atoms per molecule, and (D) From about 4 to 30 weight percent of compounds each molecule of which has:

(1) a phenyl group substituted by a vinylidene group
(2) from 8 through 13 carbon atoms
(3) as substituents from 0 through 3 groups selected from the class consisting of methyl and ethyl.

In still another preferred such mixture, there are controlled, minor amount (from about 1 to 4 weight percent-same basis) of each of methylcyclopentadiene and codimers of cyclopentadiene with acyclic conjugated alkadienes relative to a major amount (from about 92 to 96 weight percent-same basis) of dicyclopentadiene. Thus such a mixture can comprise:

(A) From about 92 to 97 weight percent of dicyclopentadiene, (B) From about 1 to 5 weight percent of compounds each molecule of which is a codimer of cyclopentadiene with at least one acyclic conjugated alkadiene having from 4 through 6 carbon atoms per molecule, and (C) From about 1 to 4 weight percent of compounds each molecule of which is a codimer of cyclopentadiene with a methylcyclopentadiene, provided that the sum of (A) and (C) in any given such cyclopentadiene dimer mixture is always at least about 95 weight percent, and preferably about 97 weight percent, thereof (same basis). Preferably, such a mixture contains at least about 3 weight percent (same basis) of (B).

Examples of suitable such acyclic conjugated alkadienes (whether or not dimerized as specified above) include butadiene (a four carbon molecule used as specified above), piperylene, isoprene, 1,3-hexadiene, 1-methyl-1,3-pentadiene, and the like.

At the time when such a mixture is reacted with phenol as indicated, there can be present as diluents inert (e.g. as respects reactivity towards components of such mixture and phenol under Friedel-Crafts reaction conditions) organic compounds, such as aromatic and aliphatic hydrocarbons. While there is no apparent upper limit on the amount of diluent which may be present, it is preferred that the amount of diluent present range from about 5 to 50 weight percent (same basis).

By the phrase "when in a form substantially free of other materials" reference is had to a mixture (e.g. of starting materials, of product, or the like, as the case may be) which is substanially free (e.g. on an analytical or theoretical basis) of substances (like inerts as respects reactivity with phenol under Friedel-Crafts catalysis) other than such mixture itself. For example, the afore-indicated starting mixture of diene codimers could have an inert hydrocarbon diluent admixed therewith, such as benzene, lower alkyl substituted benzenes, naphthalenes and alkane hydrocarbons containing from 6 through 10 carbon atoms per molecule.

The term "cyclopentadiene" as used herein refers to the cyclic compound having the structure:

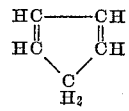

tially dehydrated resole material is controlled so that the water content of the solution of resole resin in such solvent medium (the varnish) is below about 15 weight percent (based on total weight).

While the organic liquid used has properties as indicated above, it will be appreciated that such liquid can comprise mixtures of different organic liquids. Preferred liquids are lower alkanols (such as ethanol and methanol) and lower alkanones (such as acetone or methyl ethyl ketone). The term "lower" refers to less than 7 carbon atoms per molecule as used herein. Aromatic and aliphatic (including cycloaliphatic) hydrocarbons can also be employed as solvents for a given resin, including benzene, toluene, xylene, naphthalene, nonane, octane, petroleum fractions, etc. Preferably, the total water content of a varnish of the invention is below about 10 weight percent, and more preferably falls in the range of from about 0.5 to 5 weight percent.

Those skilled in the art will appreciate that care should preferably be taken when using this procedure to use an organic liquid system in which the phenolic resole resins are completely soluble as well as any water present. Adding, for example, a ketone or an ether-ester solvent like butyl Cellosolve generally improves the water tolerance (ability to dissolve water) of a solvent system.

The varnishes thus made typically:

(A) From about 20 to 75 weight percent of the above described substituted phenol-formaldehyde resole resin,
(B) From about 0.5 to 15 weight percent of dissolved water, and
(C) The balance up to 100 weight percent of any given varnish being an organic liquid which:

(1) is substantially inert (as respects such resin mixture),
(2) boils (evaporates) below about 150° C. at atmospheric pressures,
(3) is a mutual solvent for such resin and for such water (if present).

These varnishes are characteristically dark colored, one-phase, clear liquid solutions having a viscosity ranging from about 5 to 5000 centipoises, the exact viscosity of a given varnish depending upon chemical process and product variables used in manufacture. For impregnating applications, viscosities of from about 50 to 500 centipoises are preferred.

The total solids content of a given varnish product can be as high as about 85 weight percent or even higher and as low as about 20 weight percent or even lower, but preferred solids contents usually fall in the range of from about 25 to 65 weight percent.

The organo phosphates used in the phenolic resin solutions of this invention are characterized by the Formula 1 above.

Formula 1 compounds are generally known to the prior art and can be prepared by any convenient synthetic route, for example, one preferred and convenient route is to react phosphorous oxychloride ($POCl_3$) with an appropriate halophenol. Mixtures of different halophenols (optionally with phenol itself) can be employed.

To prepare a composition of this invention, one convenient procedure involves the admixing together of a solution of water soluble phenol-formaldehyde resole resin and a solution of a substituted phenol-formaldehyde resole resin each prepared as above described. Any convenient mixing procedure can be used. In general, simple physical mixing procedures are sufficient and preferred for use in making such a mixture of these two different resole resins. It is then convenient to add to this product mixture at least one organo phosphate of the Formula 1. In general, these phosphates are soluble in the liquid of the mixture in the amounts employed so that no particular problem with dissolution of Formula 1 compound in such a liquid solution of resins is encountered when convenient preparation techniques can be employed to prepare the resin solutions of this invention. Preferred phenolic resin solutions of this invention contain from about 5 to 15 weight percent of the water soluble phenol-formaldehyde resole resin, from about 55 to 70 weight percent of the substituted phenol-formaldehyde substituted resole resin, from about 20 to 30 weight percent of the Formula 1 organo phosphate, and the balance up to 100 weight percent being an organic liquid as described above. It is desirable and preferred to so regulate the water content of the respective starting resole resins that the total water content (dissolved in organic liquid) in a product solution of the invention is under about 15 weight percent total.

As indicated above, the phenolic resin solutions of this invention are particularly well suited for use in the single pass impregnation of cellulosic substrates in laminate manufacture.

In general, an individual cellulosic substrate used in the present invention in a preformed sheet-like condition and need have no special characteristics. It can be composed of cellulosic fibers which optionally can contain up to about 50 weight percent of a synthetic organic polymeric fibrous material, such as a polyester, a polyimide, a vinylidene chloride polymer, and acrylonitrile/vinyl chloride copolymer, mixtures thereof, and the like. Typical thicknesses range from about 3 to 30 mils (under about 10 preferred). The cellulosic substrate, whether or not modified with such a polymeric fibrous material is preferably in an integral, uniform, woven or non-woven, sheet-like condition. Preferably, individual substrate members are composed of cellulose. The cellulosic fibers used in such a substrate member can be of natural or synthetic origin. Typical well known sources for cellulose fibers include wood, cotton, and the like. Typically, and preferably, average fibers used in substrates employed in this invention have length to width ratios of at least about 2:1, and more preferably about 6:1, with maximum length to width ratios being variable.

The term "substantially" as used herein in reference to cellulosic substrates has reference to the fact that such a substrate comprises mainly cellulose fibers with not more than about 5 to 10 percent of any given cellulosic substrate being other components, such as non-fibrous fillers, diluents, and the like, or fibrous non-cellulosic materials, such as those derived from organic sources (e.g. protein, synthetic organic polymeric fibers like polyesters, etc.) or inorganic sources (e.g. siliceous fibers or metallic fibers). Such other components when and if present characteristically have size ranges which are not greater in magnitude than the cellulosic fibers. Preferably, such other components are under 1 weight percent of the total weight of a starting individual cellulosic substrate member.

Particularly when high electrical properties are desired in a product laminate of the invention, the cellulosic substrate member should have a low ash content. Ash contents under 1 weight percent (based on total cellulosic substrate member weight percent) are more preferred.

Preformed cellulosic substrates are preferred for using a phenolic resin solution of this invention in laminate manufacture.

In general, impregnation of a preformed substrate cellulosic member with a solution of this invention can be accomplished by any conventional means, including spraying, dipping, coating, or the like, after which it is convenient and preferred to dry the so-treated sheet to remove residual volatile components and thereby leave an impregnated sheet-like construction. In drying, care is used to prevent leaving excessive volatile material in the impregnated sheet. In general, a volatile level of less than about 6 percent by weight is desired.

For purposes of this invention, volatile level is conveniently determined by loss in weight after 10 minutes at 160° C. of a sample impregnated sheet. As indicated, a so-impregnated sheet member contains from about 50 to 70 weight percent of solids derived from said composition.

The product intermediate impregnated sheet member can be considered to be a novel product of this invention.

When such an impregnated intermediate sheet member is to be used in the manufacture of laminates, it is preferred to use such a sheet member which has been advanced to an extent such that it has a flow of from about 3 to 20 percent (preferably from about 5 to 15 percent). To so advance a sheet member to such a flow, it is convenient to heat in air such an intermediate sheet to temperatures in the range of from about 30 to 180° C. for a time sufficient to advance same to the so-desired extent. It will be appreciated that such an advancement can be conveniently accomplished while residual volatile materials are being removed in a drying operation after impregnation, as indicated above.

Intermediate sheet-like members of this invention, whether advanced to the extent indicated or not, are generally at least about 4 mils thick and can be as thick as 25 mils, though thicknesses not more than about 10 mils are preferred.

The density of an individual intermediate sheet-like member is relatively unimportant since the laminate, as described below, is formed under heat and pressure conditions which generally solidify all components together into an integral, solid, non-porous, thermoset mass.

To make a laminate construction of this invention, one forms: At least one sheet-like member (preferably advanced as described above) into a layered configuration which is at least two layers thick with adjoining layers being substantially in face-to-face engagement. As those skilled in the art will appreciate, an individual laminate construction of the invention can comprise a series of different impregnated cellulosic substrate members at least one of which is an intermediate sheet-like member of this invention or it can comprise a series of similar such intermediate members depending upon properties desired in the product laminate.

Such a layered configuration is then subjected to pressure in the range of from about 50 to 2000 p.s.i. while maintaining temperatures in the range of from about 120 to 180° C. for a time sufficient to substantially completely thermoset the composite and thereby produce a desired laminate. Preferably, the laminate is pressed at 140 to 160° C. at 500 to 1500 p.s.i. for 15 to 60 minutes. It is preferred to use sheet members of this invention as the sole components for laminates of this invention.

The product laminates of this invention find use in a variety of applications, for example, in printed circuit and terminal boards, structural parts, electrical switches, instrument panels, switch parts, and so forth. The intermediate sheet members are useful in making filters, battery separators, etc.

EMBODIMENTS

The following examples are set forth to illustrate more clearly the principles and practices of this invention to one skilled in the art, and they are not intended to be restrictive but merely to be illustrative of the invention herein contained. Unless otherwise stated herein, all parts and percentages are on a weight basis.

Examples of substituted phenol-formaldehyde resole resins suitable for use in this invention are as follows: In these examples, the substituted phenol-formaldehyde resole resin used in each instance has an aldehyde to phenol ratio of from about 0.8 to 2.0, is produced by reacting under aqueous liquid phase conditions formaldehyde and an indicated substituted phenol mixture in the presence of an organic basic catalyst, is substantially insoluble in water but soluble in methanol to an extent that a 55 weight percent solution thereof can be prepared, and has a free formaldehyde content of less than about 5 weight percent. The substituted phenol mixture itself is prepared by reacting an indicated mixture of diene codimer compounds with phenol at a temperature ranging from about 25 to 200° C. using from about 10 to 100 parts by weight of such diene codimer compound mixture (excluding diluents) for each 100 parts by weight of phenol.

Examples of water soluble phenol-formaldehyde resole resins having a combined phenol-formaldehyde mol ratio of from about 1.0 to 2.5 suitable for use in this invention are as follows:

EXAMPLE A

Phenol (100 parts), 50 percent Formalin (111 parts) and triethylamine (5 parts) are charged to a vessel. The resulting mixture is reacted at about 70° C. until the free formaldehyde content is less than about 4 percent, after which the mixture is cooled. The product is a low molecular weight water soluble phenol-formaldehyde resole resin.

EXAMPLE B

Phenol (100 parts), 50 percent Formalin (80 parts), and triethylamine (5 parts) are charged to a vessel. The resulting mixture is reacted at about 70° C. until the free formaldehyde content is less than about 4 percent, after which the mixture is cooled. The product is a low molecular weight water soluble phenol-formaldehyde resole resin.

EXAMPLE C

Phenol (100 parts), 50 percent Formalin (128 parts) and triethylamine (5 parts) are charged to a vessel. The resulting mixture is reacted at about 70° C. until the free formaldehyde content is less than about 4 percent, after which the mixture is cooled. The product is a low molecular weight water soluble phenol-formaldehyde resole resin.

The following are examples of substituted phenols used for making resoles. Unless otherwise stated herein, all parts and percentages are on a weight basis.

EXAMPLE D

To a stirred reaction vessel 100 parts of phenol and 0.5 part concentrated sulfuric acid are charged and the resulting mixture is heated to 125° C. Then 25 parts of the diene codimer mixture from Monsanto Company (see Table I) are added to the phenol mixture over a thirty minute period, keeping the temperature between 125 and 135° C. After the addition, the mixture temperature is held at 125 to 135° C. for fifteen minutes.

EXAMPLES E TO K

Using the procedure and raw materials described above the following substituted phenol mixtures are prepared as shown in Table I.

TABLE I

| Ex. No. | Friedel-Crafts catalyst, parts per 100 phenol | Diene codimer mixture, parts per 100 phenol | Reaction temperature, °C. | Post reaction holding period, minutes |
| --- | --- | --- | --- | --- |
| E | $H_2SO_4$–0.5 | 35 | 125 | 15 |
| F | $H_2SO_4$–0.5 | 45 | 125 | 30 |
| G | $H_2SO_4$–0.5 | 55 | 125 | 30 |
| H | $H_2SO_4$–1.0 | 65 | 150 | 30 |
| I | $BF_3$ etherate–0.5 | 35 | 70 | 60 |
| J | $BF_3$ etherate–0.5 | 55 | 90 | 30 |
| K | $AlCl_3$–1.0 | 35 | 125 | 30 |

Further examples of substituted phenols follow:

EXAMPLE L

To a stirred reaction vessel 100 parts of phenol and 0.5 part concentrated sulfuric acid are charged and the resulting mixture is heated to 125° C. Then 25 parts of a diene codimer mixture comprising 95 weight percent dicyclopentadiene and 5 weight percent of a cyclopentadiene-butadiene codimer are added to the phenol mixture over a thirty minute period, keeping the temperature between 125 and 135° C. After the addition, the mixture temperature is held at 125 to 135° C. for fifteen minutes.

EXAMPLE M

The procedure for Example L is followed, except that the diene codimer mixture consists of 80 weight percent dicyclopentadiene and 20 weight percent cyclopentadiene-butadiene codimer.

Examples of phenolic resin resoles made with a substituted phenol mixture are illustrated below:

EXAMPLE N

To the substituted phenol mixture made in Example D is added (per 100 parts of phenol) 2 parts triethylamine, 2 parts hexamethylene tetramine and 83 parts of 50% Formalin. The mixture is heated to a 100° C. reflux for 55 minutes, then cooled to 50° C. and dehydrated to 60° C. and 26 inches Hg. When this temperature is reached, 80 parts methanol are added and the solution cooled. The varnish is clear and thermally cures to give a clear film. The varnish has 60.3% solids and an Ostwald viscosity of 98 centipoises.

EXAMPLE O

To the substituted phenol mixture made in Example G is added (per 100 parts of phenol) 2 parts of triethylamine, 3 parts of hexamethylenetetramine and 60 parts of 50% Formalin. The mixture is heated to a 100° C. reflux for 50 minutes, then cooled to 50° C. and dehydrated to 60° C. and 27 inches Hg. When this temperature is reached 70 parts methyl ethyl ketone are added. A clear varnish is obtained.

Examples of other varnishes are shown in Table II.

TABLE II

| Example No. | Substituted phenol, Ex. No. | Resole preparation method, Ex. No. |
|---|---|---|
| P | E | N |
| Q | F | O |
| R | H | O |
| S | I | N |
| T | J | O |
| U | K | N |
| V | L | N |
| W | M | N |

Examples of substituted phenols follow:

EXAMPLE X

To a stirred reaction vessel 100 parts of a phenol and 0.5 part concentrate sulfuric acid are charged and the resulting mixture is heated to 125° C. Then 30 parts of a diene codimer mixture from Hess Oil and Chemical Company (see Table II) is added to the phenol mixture over a thirty minute period, keeping the temperature between 125 and 135° C. After the addition, the mixture is held at 125 to 135° C. for fifteen minutes.

EXAMPLES Y–EE

Using the procedure and raw materials described above the following substituted phenol mixtures are prepared as shown on Table III.

TABLE III

| Example No. | Friedel-Crafts catalyst, parts per 100 phenol | Diene codimer mixture, parts per 100 phenol | Reaction temperature, ° C. | Post reaction holding temperature, ° C. |
|---|---|---|---|---|
| Y | H₂SO₄–0.5 | 20 | 125 | 20 |
| Z | H₂SO₄–0.5 | 40 | 125 | 30 |
| AA | H₂SO₄–0.5 | 20 | 125 | 20 |
|   |   |   |   | 50 |
| BB | H₂SO₄–1.0 | 60 | 150 | 60 |
| CC | BF₃ etherate–0.5 | 20 | 60 | 15 |
| DD | BF₃ etherate–0.5 | 60 | 150 | 60 |
| EE | AlCl₃–0.1 | 30 | 125 | 15 |

Examples of phenolic resin resoles made with the substituted phenol mixture are illustrated below:

EXAMPLE FF

To the substituted phenol mixture made in Example X is added (per 100 parts of phenol) 2 parts triethylamine, 2 parts hexamethylene tetramine and 83 parts of 50% Formalin. The mixture is heated to a 100° C. reflux for 55 minutes, then cooled to 50° C. and dehydrated to 60° C. and 26 inches Hg. When this temperature is reached, 80 parts methanol are added and the solution cooled. The varnish is clear and thermally cures to give a clear film.

EXAMPLE GG

To the substituted phenol mixture made in Example AA is added (per 100 parts of phenol) 2 parts of triethylamine, 3 parts of hexamethylenetetramine and 60 parts of 50% Formalin. The mixture is heated to a 100° C. reflux for 50 minutes, then cooled to 50° C. and dehydrated to 60° C. and 27 inches Hg. When this temperature is reached 70 parts methanol and 10 parts methyl ethyl ketone are added. A clear varnish is obtained.

Examples of other varnishes are shown in Table IV.

TABLE IV

| Example No. | Substituted phenol, Ex. No. | Resole preparation method, Ex. No. |
|---|---|---|
| HH | Y | FF |
| II | Z | GG |
| JJ | AA | GG |
| KK | BB | FF |
| LL | CC | GG |
| MM | DD | FF |

Examples of substituted phenols follow:

EXAMPLE NN

To a stirred reaction vessel 100 parts of phenol and 0.5 part concentrated sulfuric acid are charged and the resulting mixture is heated to 125° C. Then 25 parts of cyclopentadiene compound mixture from Eastman Kodak Company (Table III) are added to the phenol mixture over a thirty minute period, keeping the temperature between 125 and 135° C. After the addition, the mixture temperature is held at 125 to 135° C. for fifteen minutes. The product is a substituted phenol mixture suitable for use in practicing the present invention.

EXAMPLES OO–WW

Using the procedure and raw materials described above, the following substituted phenol mixtures are prepared as shown in Table V.

TABLE V

| Example No. | Friedel-Crafts catalyst, parts per 100 phenol | Cycopentadiene compound mixture, parts per 100 phenol | Reaction temperature | Post reaction holding period minute |
|---|---|---|---|---|
| OO | H₂SO₄–0.5 | 35 | 125 | 15 |
| PP | H₂SO₄–0.5 | 45 | 125 | 15 |
| QQ | H₂SO₄–0.5 | 55 | 125 | 35 |
| RR | H₂SO₄–0.5 | 65 | 150 | 180 |
| SS | H₂SO₄–0.5 | 75 | 150 | 180 |
| TT | H₂SO₄–2.0 | 100 | 150–160 | 240 |
| UU | H₂SO₄–1.0 | 20 | 75 | 180 |
| VV | AlCl₃–2.0 | 45 | 150 | 30 |
| WW | BF₃ etherate–0.5 | 55 | 75 | 240 |

The product in each example is a substituted phenol suitable for use in practicing the present invention.

Examples of phenolic resin resole varnishes made using the above substituted phenol mixtures are illustrated below:

EXAMPLE XX

To the substituted phenol mixture made in Example NN is added (per 100 parts of phenol) 2 parts triethylamine, 2 parts hexamethylenetetramine and 83 parts of 50% Formalin. The mixture is heated to a 100° C. reflux for one hour, then cooled to 50° C. and dehydrated to 70° C. and 26 inches Hg. When this temperature is reached, 80 parts methanol are added and the solution cooled. The varnish is clear and thermally cures to give a clear film. The varnish has 61% solids and an Ostwald viscosity of 123 centipoises.

EXAMPLE YY

To the substituted phenol mixture made in Example WW is added (per 100 parts of phenol) 2 parts triethylamine, 3 parts of hexamethylene-tetramine and 60 parts of 50% Formalin. The mixture is heated to a 100° C. reflux for 50 minutes, then cooled to 50° C. and dehydrated to 60° C. and 27 inches Hg. When this temperature is reached, 70 parts methanol and 10 parts methyl and ethyl ketone are added. A clear varnish is obtained.

EXAMPLES WW–DDD

Examples of other varnishes are shown in Table VI. Preparative procedures used are as shown in this table.

TABLE IV

| Ex. No. | Substituted phenol, Ex. No. | Resole preparation method, Ex. No. | Methylolation catalyst parts per 100 phenol |
|---|---|---|---|
| ZZ | OO | XX | As in Example XX. |
| AAA | PP | YY | As in Example YY. |
| BBB | QQ | YY | Do. |
| CCC | RR | YY | Do. |
| DDD | SS | YY | Do. |
| EEE | TT | YY | As in Example YY, plus 2 parts triethylamine. |
| FFF | UU | XX | As in Example XX, plus 1 part triethylamine. |
| GGG | VV | YY | As in Example YY, plus 1 part triethylamine. |

Examples of specific organo phosphate compounds of Formula 1 suitable for use in the phenolic resin solutions of this invention are as follows. (These compounds are known):

HHH o-chlorophenyl diphenyl phosphate
III tri(o-chlorophenyl) phosphate
JJJ 2,4-bromophenyl diphenyl phosphate
KKK p-bromophenyl diphenyl phosphate
LLL di(o-chlorophenyl) phenyl phosphate
MMM di(2,4-dichlorophenyl) phenyl phosphate The following examples illustrate phenolic resin solutions of this invention. In each instance, preparation is accomplished by mixing together the indicated quantities of components selected from the foregoing examples. Results are summarized in Table IV below.

TABLE IV

| Ex. No. | Substituted phenolic resin Type | Amount | Water soluble phenolic resin Type | Amount | Formula 1 compound Type | Amount |
|---|---|---|---|---|---|---|
| 1 | N | 100 | A | 15 | LLL | 25 |
| 2 | FF | 100 | C | 20 | JJJ | 20 |
| 3 | GG | 100 | A | 20 | HHH | 24 |
| 4 | KK | 100 | B | 10 | MMM | 15 |
| 5 | KK | 100 | C | 20 | JJJ | 20 |
| 6 | XX | 100 | C | 20 | HHH | 20 |
| 7 | YY | 100 | C | 20 | LLL | 20 |
| 8 | XX | 100 | B | 20 | KKK | 25 |
| 9 | YY | 100 | B | 20 | LLL | 25 |
| 10 | O | 100 | A | 15 | HHH | 25 |
| 11 | O | 100 | A | 20 | HHH | 25 |
| 12 | O | 100 | A | 25 | HHH | 25 |
| 13 | O | 100 | B | 20 | III | 20 |
| 14 | O | 100 | C | 20 | HHH | 25 |
| 15 | O | 100 | A | 20 | HHH | 25 |

Examples of intermediate sheet-like members made using the phenolic resin solutions of this invention are prepared as follows:

EXAMPLES 16 TO 25

Samples of preformed cellulosic substrate types are chosen as follows:

Type 1: Non-woven cotton linters paper, about 10 mils in thickness.

Type 2: Non-woven unbleached draft paper about 7 mils in thickness.

Type 3: Non-woven α-cellulose paper about 10 mils in thickness.

Type 4: Non-woven bleached kraft paper about 15 mils in thickness.

All types have an ash content less than about 0.9 weight percent.

The impregnation procedure for impregnating each above substrate is as follows:

Preformed cellulosic sheets are passed through the impregnating solution (Example II), drawn through the nip region between a pair of squeeze rolls to remove excess resin and hung in an oven at 135° C. for drying to a volatile content of less than 6 percent. Volatile content is the loss of weight of the dried impregnated sheet after exposure to 160° C. for 10 minutes. A resin content of about 60 percent and a flow of about 5 percent is thus obtained in each sample sheet so treated. Examples are illustrated in Table V below.

For purposes of this invention, flow of a green resin sheet is determined by the following procedures.

From an impregnated sample sheet, 6–2″ diameter discs are cut and assembled together in deck fashion in face-to-face engagement. Then, to opposed faces of the resulting deck there is applied about 1000 p.s.i. pressure using 150° C. for 5 minutes. Thereafter, the discs are cooled and any resin which has exuded from the discs is removed by abrasion, scraping, or the like. The difference in weight between the green sandwich and the pressed sandwich is flow.

The volatile content of each such sheet is less than 6 percent. The results are summarized in Table V below.

TABLE V

| Example No. | Preformed sheet type | Resin solution (Ex. No.) | Flow, percent |
|---|---|---|---|
| 16 | 1 | 3 | 4 |
| 17 | 2 | 3 | 6 |
| 18 | 3 | 3 | 5 |
| 19 | 4 | 3 | 5 |
| 20 | 1 | 5 | 6 |
| 21 | 1 | 6 | 7 |
| 22 | 1 | 8 | 4 |
| 23 | 1 | 11 | 5 |
| 24 | 1 | 13 | 5 |
| 25 | 1 | 14 | 6 |

Examples of laminates made using the phenolic resin solutions of this invention are prepared as follows:

EXAMPLES 26 TO 35

Using the intermediate sheet-like members prepared above in Examples 26 to 35 laminates are prepared.

The lamination procedure involves the steps of first assembling a prechosen plurality of intermediate sheet-like members into a deck or sandwich and then applying to the opposed exposed faces of the resulting deck, appropriate heat and pressure for a time sufficient to substantially completely cure the impregnated resins and produce the desired laminates. These laminates have excellent punchability and electrical characteristics. The details are summarized in Table VI below:

TABLE VI

| Example No. | Impregnated cellulosic sheet members as described in Example No. | No. of layers used | Laminate pressure, p.s.i. | Forming temp., °C. | Conditions time, min. |
|---|---|---|---|---|---|
| 26 | 16 | 7 | 1,000 | 160 | 30 |
| 27 | 16 | 8 | 1,000 | 165 | 30 |
| 28 | 17 | 7 | 1,000 | 150 | 30 |
| 29 | 18 | 7 | 1,300 | 145 | 45 |
| 30 | 19 | 7 | 1,000 | 150 | 60 |
| 31 | 20 | 8 | 1,000 | 150 | 30 |
| 32 | 21 | 8 | 1,000 | 150 | 30 |
| 33 | 22 | 8 | 1,000 | 150 | 30 |
| 34 | 23 | 8 | 1,300 | 160 | 30 |
| 35 | 24 | 8 | 1,300 | 160 | 30 |

In general, to thermoset (cure) and intermediate cellulose substrate impregnated with resin in accordance with the teachings of this invention, one conveniently heats the so-impregnated structure to a temperature ranging from about 200 to 350° F. for a time of from about 1 to 45 minutes, though lower and higher times and temperatures can be used.

What is claimed is:
1. A liquid composition adapted for use in the single-pass impregnation of cellulosic substrates comprising:
(A) from about 5 to 20 weight percent of water-soluble phenol-formaldehyde resole resin having a phenol to formaldehyde mol ratio of from about 1.0 to 2.5.
(B) from about 50 to 75 weight percent of a substituted phenol-formaldehyde resole resin,
(C) from about 15 to 35 weight percent of at least one organo phosphate of the formula:

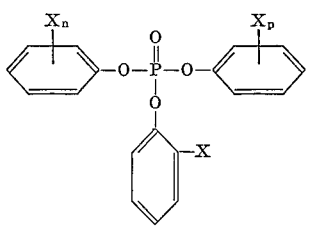

where, each individual X is selected from the group consisting of fluorine, chlorine, bromine, and iodine, and $n$, $o$, and $p$ are each an integer of from 0 through 5 inclusive, and at least one of $n$, $o$, and $p$ in any given molecule is an integer greater than 0, and
(D) the balance up to 100 weight percent of any given solution being substantially an organic liquid which:
 (1) is substantially inert,
 (2) evaporates below about 150° C. at atmospheric pressures,
 (3) is a mutual solvent for said resins and said organo phosphate
(E) said substituted phenol-formaldehyde resole resin being characterized by:
 (1) having a formaldehyde to phenol mol ratio of from about 0.8 to 2.0,
 (2) being produced by reacting under aqueous liquid phase conditions formaldehyde and a substituted phenol mixture in the presence of a basic catalyst,
 (3) being substantially insoluble in water but having a viscosity in methanol solution at 60 weight percent solids concentration of not greater than about 5000 centipoises, and
 (4) having a free formaldehyde content which is less than about 5 weight percent,
(F) said substituted phenol mixture having been prepared by reacting phenol under Friedel-Crafts conditions with from about 35 to 80 parts by weight for each 100 parts by weight of said phenol of a mixture of cyclopentadiene codimers,
(G) said mixture of cyclopentadiene codimer comprising (when in a form substantially free of other materials wherein the sum of all component compounds of any given such mixture equals substantially 100 weight percent):

(A) from about 50 to 99 weight percent of compounds each molecule of which has:
 (1) the dicyclopentadiene nucleus
 (2) from 10 through 13 carbon atoms
 (3) as nuclear substitutents from 0 through 3 methyl groups, and
(B) from about 1 to 50 weight percent of compounds each molecule of which is a codimer of cyclopentadiene with at least one acyclic conjugated alkadiene having from 4 through 6 carbon atoms per molecule.

2. An intermediate sheet-like member adapted for use in the manufacture of punchable laminates comprising:
(A) a substrate member in sheet form comprising at least 50 weight percent cellulosic fibers with the balance up to 100 weight percent of any given such member being a synthetic organic polymer fibrous material,
(B) said substrate member being impregnated with a composition of claim 1 so that said substrate contains from about 50 to 70 weight percent of total solids (dry total sheet-like member weight basis) derived from a composition of claim 1.

3. A sheet-like member of claim 2 which has been heated to temperatures in the range of from about 30 to 180° C. for a time sufficient to advance resin solids impregnated into said sheet member to an extent such that sheet-like member has a flow of from about 3 to 20 percent.

4. A laminate having relatively low water absorption characteristics, fire retardancy characteristics, relatively low crack free punch temperature characteristics, relatively low dielectric constants and relatively low dissipation factors, prepared by the steps of:
(A) forming at least one sheet-like member of claim 3 into a layered configuration which is at least two layers thick with adjoining layers being substantially in face-to-face engagement, and
(B) subjecting the so-resulting layered configuration to pressures in the range of from about 5 to 2000 p.s.i. while maintaining temperatures in the range of from about 120 to 180° C. for a time sufficient to substantially completely thermoset both said first composition and said second composition and thereby produce a desired laminate.

5. A sheet-like member of claim 2 which has been subjected to elevated temperatures for a time sufficient to substantially completely thermoset resin solids therein.

References Cited
UNITED STATES PATENTS

| | | | |
|---|---|---|---|
| 2,414,415 | 1/1947 | Rhodes | 161—259 |
| 2,827,946 | 3/1958 | Christenson et al. | 161—264 |

MORRIS SUSSMAN, Primary Examiner

U.S. Cl. X.R.

161—264; 117—155, 161; 260—30.6, 838